(12) United States Patent
Elwell et al.

(10) Patent No.: US 9,686,838 B2
(45) Date of Patent: Jun. 20, 2017

(54) SELF-LEARNING AUTO-CUTOFF DAYLIGHT DETECTION CONTROL FOR LIGHT FIXTURES

(71) Applicants: Brian Eugene Elwell, Tyrone, GA (US); Timothy R Kemp, Fayetteville, GA (US); Jonathan Andrew Whitten, Senoia, GA (US)

(72) Inventors: Brian Eugene Elwell, Tyrone, GA (US); Timothy R Kemp, Fayetteville, GA (US); Jonathan Andrew Whitten, Senoia, GA (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 15/142,571

(22) Filed: Apr. 29, 2016

(65) Prior Publication Data

US 2016/0323967 A1    Nov. 3, 2016

Related U.S. Application Data

(60) Provisional application No. 62/155,742, filed on May 1, 2015.

(51) Int. Cl.
*H05B 37/02* (2006.01)

(52) U.S. Cl.
CPC ................ *H05B 37/0218* (2013.01)

(58) Field of Classification Search
CPC  H05B 37/02; H05B 37/0227; H05B 37/0218; Y02B 20/46
USPC ........................................................ 315/151
See application file for complete search history.

(56) References Cited

U.S. PATENT DOCUMENTS

| | | | |
|---|---|---|---|
| 2006/0278808 A1 | 12/2006 | Hick et al. | |
| 2008/0074059 A1* | 3/2008 | Ahmed | H05B 37/0218 315/291 |
| 2012/0206050 A1 | 8/2012 | Spero | |
| 2012/0248993 A1* | 10/2012 | Lin | H05B 33/0815 315/160 |
| 2013/0320862 A1* | 12/2013 | Campbell | H05B 37/02 315/152 |

(Continued)

FOREIGN PATENT DOCUMENTS

WO    WO 2015/057055    4/2015

OTHER PUBLICATIONS

International Search Report for PCT Patent Application No. PCT/US2016/030100 mailed Aug. 25, 2016.

*Primary Examiner* — Don Le
(74) *Attorney, Agent, or Firm* — King & Spalding LLP

(57) ABSTRACT

A light fixture can include at least one light fixture component comprising at least one light source that emits a first level of fixture light. The light fixture can also include at least one sensor that measures a first total light amount at a first time of a first day, where the first total light amount includes the first level of fixture light and a first natural light amount. The light fixture can further include a controller coupled to the at least one sensor and the at least one light fixture component, where the controller controls and communicates with at least one sensor. The controller can further control the at least one light fixture component based on the first total light amount measured by the at least one sensor at the first time of the first day.

17 Claims, 8 Drawing Sheets

(56) References Cited

U.S. PATENT DOCUMENTS

2014/0001846 A1\* 1/2014 Mosebrook ......... H04L 12/2816
307/11

\* cited by examiner

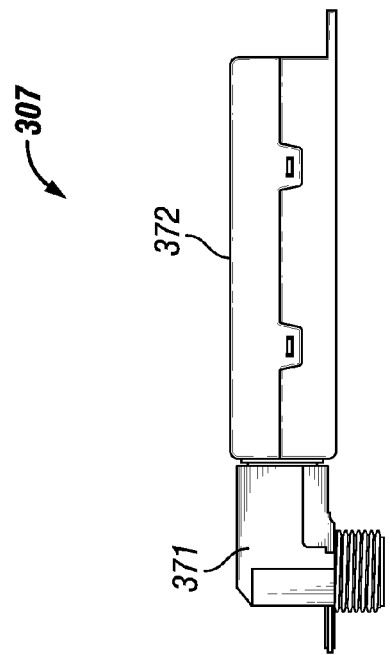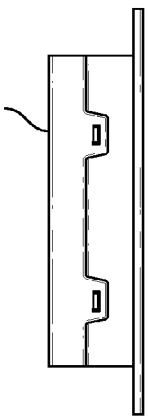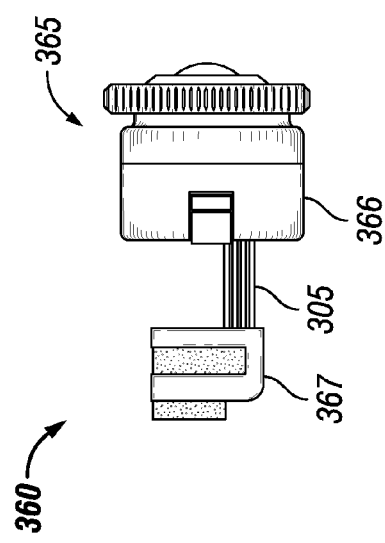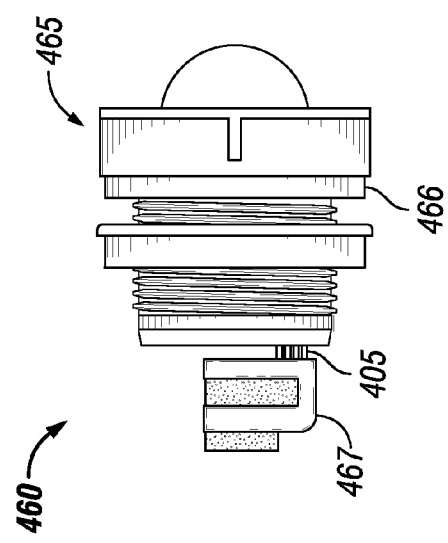

SELF-LEARNING AUTO-CUTOFF DAYLIGHT DETECTION CONTROL FOR LIGHT FIXTURES

RELATED APPLICATIONS

The present application claims priority under 35 U.S.C. §119(e) to U.S. Provisional Patent Application No. 62/155,742, filed on May 1, 2015, and titled "Dim To Off Light Fixture Control." The entire content of the foregoing application is hereby incorporated herein by reference.

TECHNICAL FIELD

The present disclosure relates generally to light fixtures, and more particularly to systems, methods, and devices for light fixtures that can be automatically dimmed and/or turned off.

BACKGROUND

Energy efficiency is becoming an increasingly important goal for manufacturers and consumers. Energy efficiency measures can be applied to any of a number of different electrical devices. For example, light fixtures can be subject to energy efficiency measures.

SUMMARY

In general, in one aspect, the disclosure relates to a light fixture. The light fixture can include at least one light fixture component having at least one light source that emits a first level of fixture light. The light fixture can also include at least one sensor that measures a first total light amount at a first time of a first day, where the first total light amount includes the first level of fixture light and a first natural light amount. The light fixture can further include a controller coupled to the at least one sensor and the at least one light fixture component, where the controller controls and communicates with at least one sensor. The controller can further control the at least one light fixture component based on the first total light amount measured by the at least one sensor at the first time of the first day.

In another aspect, the disclosure can generally relate to a controller for a light fixture. The controller for a light fixture can include memory having a number of instructions. The controller for a light fixture can also include a control engine coupled to the memory, where the controller is configured to send and receive communication signals with at least one sensor and at least one light fixture component based on the plurality of instructions, where the at least one light fixture component includes at least one light source, where the at least one sensor measures a first total light amount at a first time of a first day, where the first total light amount includes the first level of fixture light and a first natural light amount, where the control engine compares the first total light amount to a threshold value, where the control engine further controls the at least one light fixture component based comparing the first total light amount to the threshold value, where the at least one light source emits a first level of fixture light based on the control engine controlling the at least one light fixture component.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

FIGS. 3A, 3B, 4A, and 4B show different sensors in accordance with certain example embodiments.

DETAILED DESCRIPTION

Figure 1:
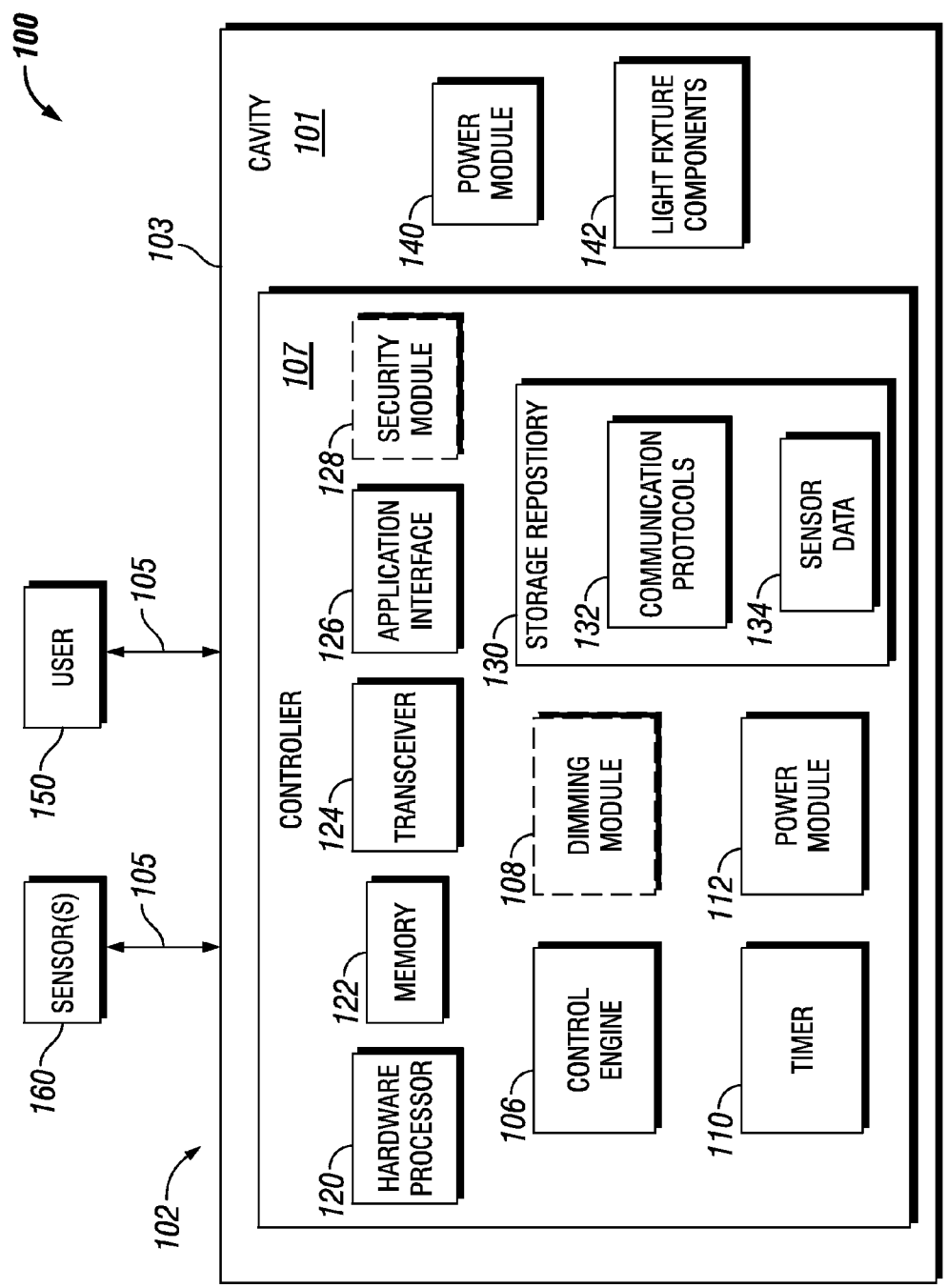
FIG. 1 shows a system diagram of a system that includes a light fixture in accordance with certain example embodiments.

In general, example embodiments provide systems, methods, and devices for light fixtures with self-learning auto-cutoff daylight detection control for light fixtures. Example light fixtures with self-learning auto-cutoff daylight detection control for light fixtures provide a number of benefits. Such benefits can include, but are not limited to, reduced power consumption, improved communication efficiency, ease of maintenance, and compliance with industry standards that apply to electrical enclosures located in certain environments. Example embodiments can be used with new light fixtures. Alternatively example embodiments can be used to retrofit existing light fixtures.

In some cases, the example embodiments discussed herein can be used in any type of environment, whether in a commercial, residential, industrial, indoor, or outdoor setting. A user may be any person that interacts with example light fixtures with self-learning auto-cutoff daylight detection control for light fixtures. Examples of a user may include, but are not limited to, an engineer, an electrician, an instrumentation and controls technician, a homeowner, a foreman, a supervisor, a worker, a landlord, a building owner, a maintenance worker, a mechanic, an operator, a consultant, a contractor, and a manufacturer's representative.

The example light fixtures with self-learning auto-cutoff daylight detection control for light fixtures (or components thereof, including controllers) described herein can be made of one or more of a number of suitable materials to allow the light fixture and/or other associated components of a system to meet certain standards and/or regulations while also maintaining durability in light of the one or more conditions under which the light fixtures and/or other associated components of the system can be exposed. Examples of such materials can include, but are not limited to, aluminum, stainless steel, fiberglass, glass, plastic, ceramic, and rubber.

Example light fixtures with self-learning auto-cutoff daylight detection control for light fixtures, or portions thereof, described herein can be made from a single piece (as from a mold, injection mold, die cast, or extrusion process). In addition, or in the alternative, example light fixtures with self-learning auto-cutoff daylight detection control for light fixtures can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

In the foregoing figures showing example embodiments of light fixtures with self-learning auto-cutoff daylight detection control for light fixtures, one or more of the components shown may be omitted, repeated, and/or substituted. Accordingly, example embodiments of light fixtures with self-learning auto-cutoff daylight detection control for light fixtures should not be considered limited to the specific arrangements of components shown in any of the figures. For example, features shown in one or more figures or described with respect to one embodiment can be applied to another embodiment associated with a different figure or description.

Further, unless a statement is expressly made to the contrary, any description of a figure or embodiment made herein stating that one or more components are not included in the figure or embodiment does not mean that such one or more components could not be included in the figure or embodiment. Instead, such statement should only be interpreted to mean that such one or more components are not shown in the particular figure or embodiment. For the purposes of the claims set forth herein, such one or more components can be included in one or more claims directed to such figure or embodiment, In addition, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits.

As defined herein, an electrical enclosure is any type of cabinet or housing inside of which is disposed electrical and/or electronic equipment. Such electrical and/or electronic equipment can include, but is not limited to, a control module, a hardware processor, a power module (e.g., a battery, a driver, a ballast), a timer, a sensor module, a safety barrier, a sensor, sensor circuitry, a light source, electrical cables, and electrical conductors. Examples of an electrical enclosure can include, but are not limited to, a housing for a light fixture, a housing for a sensor device, a housing for a controller, an electrical connector, a junction box, a motor control center, a breaker box, an electrical housing, a conduit, a control panel, an indicating panel, and a control cabinet.

In certain example embodiments, light fixtures with self-learning auto-cutoff daylight detection control for light fixtures are subject to meeting certain standards, laws, regulations, and/or other requirements. For example, various portions of Title 24 of the California Code of Regulations currently requires that a light fixture turn off when daylight exceeds 150% of the maximum light output of the light fixture. As a more specific example, Section 130.1(d)3.B.iv sets the aforementioned requirement for light fixtures in parking garages.

Other entities that can set standards, laws, regulations, and/or other requirements for light fixtures with self-learning auto-cutoff daylight detection control for light fixtures can include, but are not limited to, the National Electric Code (NEC), the National Electrical Manufacturers Association (NEMA), Underwriters Laboratories (UL), the International Electrotechnical Commission (IEC), and the Institute of Electrical and Electronics Engineers (IEEE). Use of example embodiments described herein meet (and/or allow a corresponding device to meet) such standards when required. In some (e.g., PV solar) applications, additional standards particular to that application may be met by the light fixtures described herein.

Example embodiments of light fixtures with self-learning auto-cutoff daylight detection control for light fixtures will be described more fully hereinafter with reference to the accompanying drawings, in which example embodiments of light fixtures with self-learning auto-cutoff daylight detection control for light fixtures are shown. Light fixtures with self-learning auto-cutoff daylight detection control for light fixtures may, however, be embodied in many different forms and should not be construed as limited to the example embodiments set forth herein. Rather, these example embodiments are provided so that this disclosure will be thorough and complete, and will fully convey the scope of light fixtures with self-learning auto-cutoff daylight detection control for light fixtures to those of ordinary skill in the art. Like, but not necessarily the same, elements (also sometimes called components) in the various figures are denoted by like reference numerals for consistency.

Terms such as "first", "second", and "within" are used merely to distinguish one component (or part of a component or state of a component) from another. Such terms are not meant to denote a preference or a particular orientation, and are not meant to limit embodiments of light fixtures with self-learning auto-cutoff daylight detection control for light fixtures. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a system diagram of a lighting system 100 that includes a light fixture 102 in accordance with certain example embodiments. The lighting system 100 can include one or more sensors 160, a user 150, and a light fixture 102. The light fixture 102 can include a controller 107, a power module 140, and a number of light fixture components 142. The controller 107 can include one or more of a number of components. Such components, can include, but are not limited to, a control engine 106, a dimming module 108, a timer 110, a power module 112, a storage repository 130, a hardware processor 120, a memory 122, a transceiver 124, an application interface 126, and, optionally, a security module 128. The components shown in FIG. 1 are not exhaustive, and in some embodiments, one or more of the components shown in FIG. 1 may not be included in an example light fixture. Any component of the example light fixture 102 can be discrete or combined with one or more other components of the light fixture 102.

The user 150 is the same as a user defined above. The user 150 can use a user system (not shown), which may include a display (e.g., a GUI). The user 150 interacts with (e.g., sends data to, receives data from) the controller 107 of the light fixture 102 via the application interface 126 (described below). The user 150 can also interact with the controller 107 of the light fixture 102 and/or one or more of the sensors 160. Interaction between the user 150 and the light fixture 102 and the sensors 160 is conducted using communication links 105. Each communication link 105 can include wired (e.g., Class 1 electrical cables, Class 2 electrical cables, electrical connectors) and/or wireless (e.g., Wi-Fi, visible light communication, cellular networking, Bluetooth) technology. For example, a communication link 105 can be (or include) one or more electrical conductors that are coupled to the housing 103 of the light fixture 102 and to a sensor 160. The communication link 105 can transmit signals (e.g., power signals, communication signals, control signals, data) between the light fixture 102, the user 150, and/or one or more of the sensors 160.

The one or more sensors 160 can be any type of sensing device that measure one or more parameters. Examples of types of sensors 160 can include, but are not limited to, a passive infrared sensor, a photocell, and a resistance temperature detector. A parameter that can be measured by a sensor 160 can include, but is not limited to, motion, an amount of ambient light (also called an ambient light amount herein), occupancy of a space, and an ambient temperature. In some cases, the parameter or parameters measured by a sensor 160 can be used to operate one or more light fixture components 142 of the light fixture 102.

Each sensor 160 can use one or more of a number of communication protocols that is also used by the controller 107. Multiple sensors 160 can be part of a single sensor device or multiple sensor devices. A sensor 160 can be integrated into the housing 103 of the light fixture 102. Alternatively, a sensor 160 can be remotely located relative to the housing 103 of the light fixture 102. As yet another alternative, a sensor 160 can be disposed within the cavity 101 formed by the housing 103 of the light fixture 102.

The user 150 and/or the sensors 160 can interact with the controller 107 of the light fixture 102 using the application interface 126 in accordance with one or more example embodiments. Specifically, the application interface 126 of the controller 107 receives data (e.g., information, communications, instructions) from and sends data (e.g., information, communications, instructions) to the user 150 and/or each sensor 160. The user 150 and/or each sensor 160 can include an interface to receive data from and send data to the controller 107 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 107, the user 150, and/or the sensors 160 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 107. Examples of such a system can include, but are not limited to, a desktop computer with LAN, WAN, Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 12.

Further, as discussed above, such a system can have corresponding firmware and/or software (collectively, "software") (e.g., user software, sensor software, controller software, master controller software). The software can execute on the same or a separate device (e.g., a server, mainframe, desktop personal computer (PC), laptop, personal data assistant (PDA), television, cable box, satellite box, kiosk, telephone, mobile phone, or other computing devices) and can be coupled by the communication network (e.g., Internet, Intranet, Extranet, Local Area Network (LAN), Wide Area Network (WAN), or other network communication methods) and/or communication channels, with wire and/or wireless segments according to some example embodiments. The software of one system can be a part of, or operate separately but in conjunction with, the software of another system within the system 100.

The light fixture 102 can include a housing 103. The housing 103 can include at least one wall that forms a cavity 101. In some cases, the housing can be designed to comply with any applicable standards so that the light fixture 102 can be located in a particular environment (e.g., an outdoor environment). The housing 103 of the light fixture 102 can be used to house one or more components of the light fixture 102, including one or more components of the controller 107. For example, as shown in FIG. 1, the controller 107 (which in this case includes the control engine 106, the dimming module 108, the timer 110, the power module 112, the storage repository 130, the hardware processor 120, the memory 122, the transceiver 124, the application interface 126, and the optional security module 128), the power module 140, and the light fixture components 142 are disposed in the cavity 101 formed by the housing 103. In alternative embodiments, any one or more of these or other components of the light fixture 102 can be disposed on the housing 103 and/or remotely from the housing 103.

The storage repository 130 can be a persistent storage device (or set of devices) that stores software and data used to assist the controller 107 in communicating with the user 150 and one or more sensors 160 within the system 100. In one or more example embodiments, the storage repository 130 stores one or more communication protocols 132, light source data 133, sensor data 134, and threshold values 135. The communication protocols 132 can be any of a number of protocols that are used to send and/or receive data between the controller 107, the user 150, and one or more sensors 160.

Light source data 134 can be any data associated with each light source 141 of the light fixture components 142. Such data can include, but is not limited to, a manufacturer of the light source 141, a model number of the light source 141, output capability (e.g., color, lumens, dimming capability) of the light source 141, power requirements of the light source 141, and hours of operation of the light source 141.

Sensor data 134 can be any data associated with each sensor 160 that is communicably coupled to the controller 107. Such data can include, but is not limited to, a manufacturer of the sensor 160, a model number of the sensor 160, communication capability of a sensor 160, power requirements of a sensor 160, and measurements taken by the sensor 160. Threshold values 135, as described below, can be any one or more values (e.g., total light amount) of light detected by a sensor 160. In certain example embodiments, threshold values 135 can differ for certain conditions. For example, a threshold value (e.g., a total light amount) can have one value for work days and/or hours and another value for non-working days and/or hours (e.g., weekends).

Examples of a storage repository 130 can include, but are not limited to, a database (or a number of databases), a file system, a hard drive, flash memory, some other form of solid state data storage, or any suitable combination thereof. The storage repository 130 can be located on multiple physical machines, each storing all or a portion of the communication protocols 132, the light source data 133, the threshold values 135, and/or the sensor data 134 according to some example embodiments. Each storage unit or device can be physically located in the same or in a different geographic location.

The storage repository 130 can be operatively connected to the control engine 106. In one or more example embodiments, the control engine 106 includes functionality to communicate with the user 150 and the sensors 160 in the system 100. More specifically, the control engine 106 sends information to and/or receives information from the storage repository 130 in order to communicate with the user 150 and the sensors 160. In certain example embodiments, the control engine 106 of the controller 107 controls the operation of one or more components (e.g., the dimming module 108, the timer 110, the transceiver 124) of the controller 107. For example, the control engine 106 can put the dimming module 108 in "sleep" mode (reduced power or minimal power mode of operation when dimming is not used that can quickly ramp up to increased power or full power operation when dimming is utilized) when an amount of light detected by the sensor 160 exceeds threshold value. In such a case, power consumed by the controller 107 is conserved by only enabling the dimming module 108 when the dimming module 108 is needed.

As another example, the control engine 106 can direct the timer 110 to provide a current time, to begin tracking a time period, and/or perform another function within the capability of the timer 110. As yet another example, the control engine 106 can direct the power module 112 to send power signals and/or stop sending power signals to one or more sensors 160 in the system 100. This example provides another instance where the control engine 106 can conserve power used by the controller 107 and other components of the system 100. As yet another example, the control engine 106 of the controller 107 can eliminate power to one or more components of the light fixture 102 to effectively turn off the light fixture 102 when an amount of total light (also called a total light amount) detected by the sensor 160 exceeds a threshold value.

The control engine 106 can provide control, communication, and/or other similar signals to the user 150, one or more other components of the light fixture 102, and one or more of the sensors 160. Similarly, the control engine 106 can receive control, communication, and/or other similar signals from the user 150, one or more other components of the light fixture 102, and one or more of the sensors 160. The control engine 106 can control each sensor 160 automatically (for example, based on one or more algorithms stored in the control engine 106) and/or based on control, communication, and/or other similar signals received from another device through a communication link 105. The control engine 106 may include a printed circuit board, upon which the hardware processor 120 and/or one or more discrete components of the controller 107 are positioned.

The control engine 106 can self-calibrate (also called self-learning herein), as described below, based on one or more of a number of factors. Such factors can include, but are not limited to, the characteristics (e.g., minimum dim on level, maximum light output, lumens) of a light source, the characteristics of the power module 140, the weather (e.g., cloud cover, weather season), and time (e.g., month of year, day of month, time of day). The control engine 106 can self-calibrate and/or otherwise operate for any period of time (e.g., a day, a week, a month, a year, multiple years, the life of a light fixture). Further, the control engine 106 can self-calibrate and/or otherwise operate continuously for such period of time.

In certain example embodiments, the control engine 106 can include an interface that enables the control engine 106 to communicate with one or more components (e.g., power module 140) of the light fixture 102. For example, if the power module 140 of the light fixture 102 operates under IEC Standard 62386, then the power module 140 can include a digital addressable lighting interface (DALI). In such a case, the control engine 106 can also include a DALI to enable communication with the power module 140 within the light fixture 102. Such an interface can operate in conjunction with, or independently of, the communication protocols 132 used to communicate between the controller 107, the user 150, and the sensors 160.

The control engine 106 (or other components of the controller 107) can also include one or more hardware and/or software architecture components to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

By using the control engine 106 as described herein, the controller 107 can effectively turn off the light fixture 102 when the sensor 160 detects that the total light amount exceeds a threshold value. Similarly, the controller 107 can turn on the light fixture 102 when the sensor 160 detects that the total light amount falls below a threshold value. In other words, while at least a portion (e.g., the control engine 106) of the controller 107 is always on, the remainder of the controller 107, the rest of the light fixture 102, and the sensors 160 can be in sleep mode (reduced power or minimal power mode of operation when the remainder of the controller 107, the rest of the light fixture 102, and/or the sensors 160 are not in use that can quickly ramp up to increased power or full power operation when functions that use the remainder of the controller 107, the rest of the light fixture 102, and/or the sensors 160 are called upon) when they are not being used.

The optional dimming module 108 of the controller 107 determines a dimming level of the light emitted by the light fixture. This determination can be based, at least in part, on a measurement (e.g., the total light amount detected) of the sensor 160 and on a threshold value of the storage repository 130. In some cases, the dimming module 108 accesses the light source data 133 and/or the sensor data 134 to determine a dimming level. The dimming module 108 can send data (e.g., a dimming level) directly to and/or retrieve data directly from the storage repository 130. Alternatively, the control engine 106 can facilitate the transfer of data between the dimming module 108 and the storage repository 130.

The timer 110 of the controller 107 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can track time periods based on an instruction received from the control engine 106, based on an instruction received from the user 150, based on an instruction programmed in the software for the controller 107, based on some other condition or from some other component, or from any combination thereof.

The power module 112 of the controller 107 provides power to one or more other components (e.g., timer 110, control engine 106) of the controller 107. In addition, in certain example embodiments, the power module 112 can provide power to the power module 140 of the light fixture 102. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned.

The power module 112 can include one or more components (e.g., a transformer, a diode bridge, an inverter, a converter) that receives power (for example, through an electrical cable) from a source external to the light fixture 102 and generates power of a type (e.g., alternating current, direct current) and level (e.g., 12V, 24V, 120V) that can be used by the other components of the controller 107 and/or by the power module 140. In addition, or in the alternative, the power module 112 can be a source of power in itself to provide signals to the other components of the controller 107 and/or the power module 140. For example, the power module 112 can be a battery. As another example, the power module 112 can be a localized photovoltaic power system.

In certain example embodiments, the power module 112 of the controller 107 can also provide power and/or control signals, directly or indirectly, to one or more of the sensors 160. In such a case, the control engine 106 can direct the power generated by the power module 112 to the sensors 160 and/or the power module 140 of the light fixture 102. In this way, power can be conserved by sending power to the sensors 160 and/or the power module 140 of the light fixture 102 when those devices need power, as determined by the control engine 106.

The hardware processor 120 of the controller 107 executes software in accordance with one or more example embodiments. Specifically, the hardware processor 120 can execute software on the control engine 106 or any other portion of the controller 107, as well as software used by the user 150 and/or one or more of the sensors 160. The hardware processor 120 can be an integrated circuit, a central processing unit, a multi-core processing chip, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 is discretely located within the controller 107 relative to the hardware processor 120 according to some example embodiments. In certain configurations, the memory 122 can be integrated with the hardware processor 120.

In certain example embodiments, the controller 107 does not include a hardware processor 120. In such a case, the controller 107 can include, as an example, one or more field programmable gate arrays (FPGA). Using FPGAs and/or other similar devices known in the art allows the controller 107 (or portions thereof) to be programmable and function according to certain logic rules and thresholds without the use of a hardware processor.

The transceiver 124 of the controller 107 can send and/or receive control and/or communication signals. Specifically, the transceiver 124 can be used to transfer data between the controller 107, the user 150, and/or the sensors 160. The transceiver 124 can use wired and/or wireless technology. The transceiver 124 can be configured in such a way that the control and/or communication signals sent and/or received by the transceiver 124 can be received and/or sent by another transceiver that is part of the user 150 and/or the sensors 160.

When the transceiver 124 uses wireless technology, any type of wireless technology can be used by the transceiver 124 in sending and receiving signals. Such wireless technology can include, but is not limited to, Wi-Fi, visible light communication, cellular networking, ZigBee, and Bluetooth. The transceiver 124 can use one or more of any number of suitable communication protocols when sending and/or receiving signals. Such communication protocols can be stored in the communication protocols 132 of the storage repository 130. Further, any transceiver information for the user 150 and/or the sensors 160 can be part of the sensor data 134 (or similar areas) of the storage repository 130.

Optionally, in one or more example embodiments, the security module 128 secures interactions between the controller 107, the user 150, and/or the sensors 160. More specifically, the security module 128 authenticates communication from software based on security keys verifying the identity of the source of the communication. For example, user software may be associated with a security key enabling the software of the user 150 to interact with the controller 107 and/or the sensors 160. Further, the security module 128 can restrict receipt of information, requests for information, and/or access to information in some example embodiments.

As mentioned above, aside from the controller 107 and its components, the light fixture 102 can include a power module 140 and one or more light fixture components 142. The light fixture components 142 of the light fixture 102 are devices and/or components typically found in a light fixture to allow the light fixture 102 to operate. A light fixture component 142 can be electrical, electronic, mechanical, or any combination thereof. The light fixture 102 can have one or more of any number and/or type of light fixture components 142. Examples of such light fixture components 142 can include, but are not limited to, a control module, one or more light sources 141, a light engine, a heat sink, an electrical conductor or electrical cable, a terminal block, a lens, a diffuser, a reflector, an air moving device, a baffle, a dimmer, and a circuit board.

Each light source 141 of the light fixture components 142 can include one or more devices and/or components typically found in a light fixture to allow the light fixture 102 to operate (e.g., illuminate). A light source 141 can be electrical, electronic, mechanical, or any combination thereof. Examples of such light sources 141 (or components thereof) can include, but are not limited to, a local control module, a light bulb, a light engine, a heat sink, an electrical conductor, an electrical cable, a terminal block, a lens, a diffuser, a reflector, an air moving device, a baffle, a dimmer, and a circuit board. A light source 141 can use any of a number of lighting technologies, including but not limited to LED, incandescent, fluorescent, sodium vapor, and halogen.

The power module 140 of the light fixture 102 provides power to one or more of the light fixture components 142. The power module 140 can be substantially the same as, or different than, the power module 112 of the controller 107. The power module 140 can include one or more of a number of single or multiple discrete components (e.g., transistor, diode, resistor), and/or a microprocessor. The power module 140 may include a printed circuit board, upon which the microprocessor and/or one or more discrete components are positioned. The power module 140 can be called one or more of a number of other names, including but not limited to a driver, a LED driver, and a ballast.

The power module 140 can include one or more components (e.g., a transformer, a diode bridge, an inverter, a converter) that receives power (for example, through an electrical cable) from the power module 112 of the controller 107 and generates power of a type (e.g., alternating current, direct current) and level (e.g., 12V, 24V, 120V) that can be used by the light fixture components 142. In addition, or in the alternative, the power module 140 can receive power from a source external to the light fixture 102. In addition, or in the alternative, the power module 140 can be a source of power in itself. For example, the power module 140 can be a battery, a localized photovoltaic power system, or some other source of independent power.

Figure 2A:
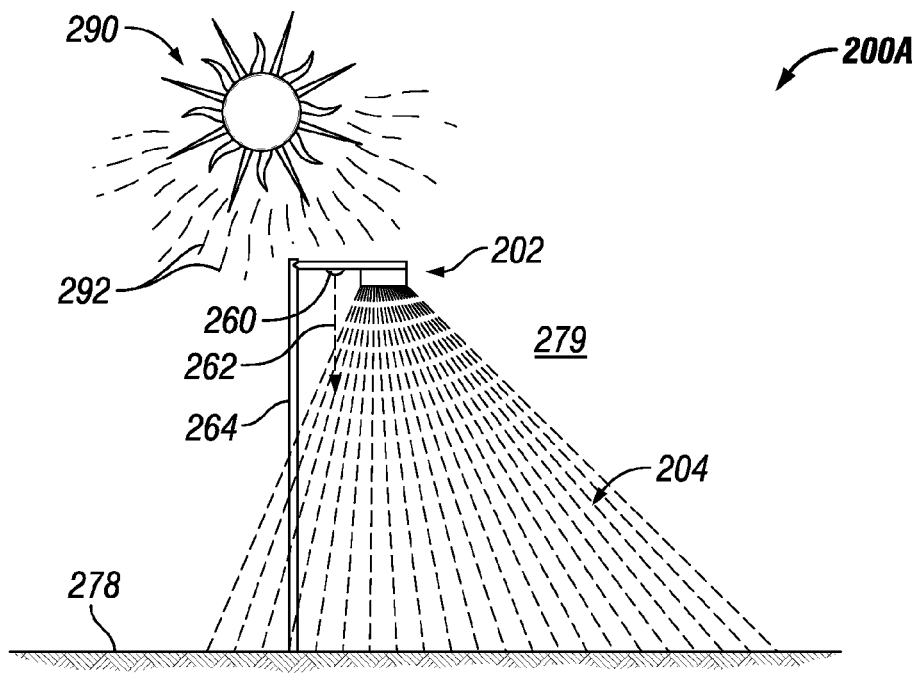
FIGS. 2A and 2B show an example sensor with a light fixture applied in a space in accordance with certain example embodiments.
Figure 2B:
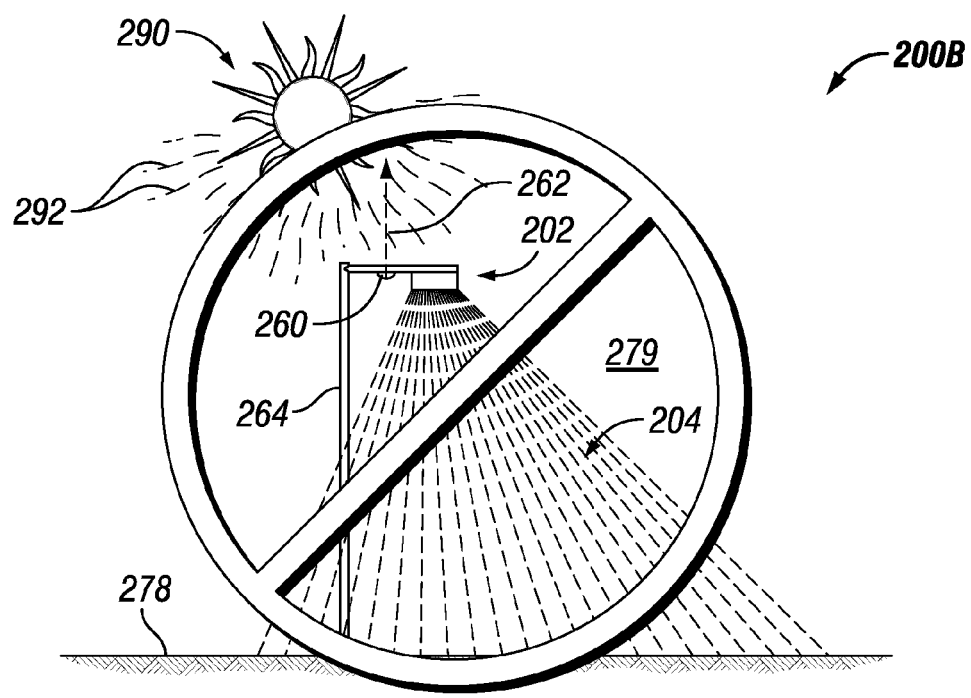

FIGS. 2A and 2B each shows a system that includes an example sensor 260 with a light fixture 202 applied in a space 279 in accordance with certain example embodiments. Specifically, FIG. 2A shows a closed-loop algorithm, where the example sensor 260 is used properly, and FIG. 2B shows an open-loop algorithm, where the example sensor 260 is used improperly. Referring to FIGS. 1-2B, the sensor 260 of FIGS. 2A and 2B are physically remote from (located outside the housing 203 of) the rest of the light fixture 202. The sensor 260 and light fixture 202 in system 200A of FIG. 2A and in system 200B in FIG. 2B hang from a mounting structure 264 that place the sensor 260 and light fixture 202 at some height above a surface 278. The sensor 260 is aimed in a direction 262 that allows the sensor to measure light 204 emitted by the light source 202 as well as other light 292 (e.g., ambient light, sunlight). In this case, the direction 262 in which the sensor 260 is aimed is at the surface 278, toward which light 204 emitted by the light fixture 202 is also directed.

The surface 278 can be the ground, a road, a walkway, a driveway, a building wall, a floor, or any other suitable surface. The readings (measurements) of light made by the sensor 260 can vary based on one or more of a number of factors. Such factors can include, but are not limited to, the color of the surface 278, the reflectivity of the surface 278, the angle of the sensor 260 relative to the surface 278, the distance of the sensor 260 to the surface 278, any objects (e.g., motor vehicles) located on the surface 278, and any objects (e.g., tree branches) in the path of the sensor to the surface 278. In other words, relying on the sensor 260 without accounting for these factors can often result in inaccurate readings of light by the sensor 260. In this way, example embodiments described herein allow for the sensor 260 to take measurements at times when light emitted by the light fixture 202 is the sole source of light measured by the sensor 260, which coincides with when the light fixture 202 is emitting its maximum light output.

As mentioned above, in the system 200A of FIG. 2A and in the system 200B of FIG. 2B, the light 204 emitted by the light fixture 202 is directed toward the surface 278. The direction 262 to which the sensor 260 is directed is at a portion of the surface 278 that overlaps with where the light 204 emitted by the light fixture 202 is directed. The light 204 can be reflected off the surface 278 toward the sensor 260 and/or otherwise read by the sensor 260 as part of the total light. The sensor 260 and the light fixture 202 of FIGS. 2A and 2B are placed in an outdoor space 279 during daylight, when the sun 290 is out. The sun 290 shines visible light 292 in a number of directions, including intersecting the volume of space where the light fixture 202 directs its light 204. As a result, most, if not all, of the volume of space that is within the distribution of light 204 from the light fixture 202 also receives light 292 from the sun 290. The direction 262 in which the sensor 260 is pointed can lead to different amounts of total light detected. As shown in FIG. 2A, the sensor 260 is directed toward (aimed at) the surface 278 in the direction 262 where the light 204 is emitted by the light fixture 202. In such a case, the sensor 260 detects total light that is a combination of the light 204 emitted by the light fixture 202 and the light 292 emitted by the sun 290. Specifically, the sensor 260 can detect total light that is a combination of the light 204 is emitted by the light fixture 202 and reflected off the surface 278, as well as the light 292 emitted by the sun 290 and reflected off the surface 278. Alternatively, the sensor 260 can be placed indoors, reading both the light 204 emitted by the light fixture 202 and ambient light 292.

In some cases, sensor 260 can be multiple sensors that measure total light. For example, one sensor 260 can be directed toward the light fixture 202 directly, and another sensor 260 can be directed at the surface 278 to measure the total reflected light. In such a case, the sensor 260 directed directly at the light fixture 202 can use a factory preset value for 150% light output for that light fixture 202 to ensure that the controller 107 dims, turns on, and/or turns off the light fixture 202 at the correct light level. In some cases, this sensor 260 directed directly at the output of the light fixture 202 can simply measure the light level when the controller 107 reaches 100% dim level (when there is no light 292 from the sun 290 or light from other sources) and use that measurement to determine the a threshold value (e.g., 150%), as described below. By contrast, in FIG. 2B, the sensor 260 is directed away from the surface 278, and so away from the light 204 is emitted by the light fixture 202. As a result, the sensor 260 only detects the light 292 emitted by the sun 290 and is unable to detect the light 204 emitted by the light fixture 202.

Example embodiments are designed to be configured substantially similar to the system 200A of FIG. 2A as opposed to the system 200 B of FIG. 2B. In other words, sensors used in example embodiments are designed to measure the total light in a volume of space, regardless of the number of light sources that emit light into such space. Thus, referring to FIGS. 2A and 2B, if the volume of space that is to be measured is within the volume of space that the light 204 emitted by the light fixture 202 covers, then the sensor 260 should be directed toward that volume of space (as shown in FIG. 2A).

FIGS. 3A, 3B, 4A, and 4B show different sensors in accordance with certain example embodiments. FIG. 3A shows a sensor 360 that includes a sensor head 365, and FIG. 3B shows a controller 307. FIG. 4A shows a sensor 360 that includes a sensor head 465, and FIG. 4B shows a controller 407. Referring to FIGS. 1-4B, the controller 307 of FIG. 3B and the controller 407 of FIG. 4B are substantially the same as the controller 107 of FIG. 1. In certain example embodiments, the controller (e.g., controller 307, controller 407) is disposed within the housing 103 of the light fixture 102. Alternatively, the controller (e.g., controller 307, controller 407) can be disposed within their own housing (housing 372 and housing 472, respectively), outside the housing 103 of the light fixture 102. The various components of the sensor 160 and the controller 107 of FIG. 1 can be found in the sensor head 365 of FIG. 3A, the sensor head 465 of FIG. 4A, the controller 307 of FIG. 3B, and/or the controller 407 of FIG. 4B.

The sensor head 365 of FIG. 3A includes a sensor device 366, a coupling feature 367, and one or more communication links 305 that run between the sensor device 366 and the coupling feature 367. The coupling feature 367 can be disposed, at least in part, within the housing 372 and/or within the auxiliary housing 371 coupled to the housing 372. The auxiliary housing 371 can serve as an extension to the housing 372 that can position the sensor device 366 in a desired orientation (e.g., pointing toward light emitted by an associated light source).

The coupling feature 367 of the sensor head 365 can be configured to couple to a complementary coupling feature disposed within the housing 372 or the auxiliary housing 371. The coupling feature 367 (in this case, an electrical connector) can mechanically and electrically couple to the complementary coupling feature of the controller 307. The sensor device 366 can include one or more coupling features (e.g., mating threads) that couple to complementary coupling features (e.g., complementary mating threads) of the auxiliary housing 371.

Similarly, the sensor head 465 of FIG. 4A includes a sensor device 466, a coupling feature 467, and one or more communication links 405 that run between the sensor device 466 and the coupling feature 467. The coupling feature 467 can be disposed, at least in part, within the housing 472. The sensor 460 of FIG. 4B has no auxiliary housing. The coupling feature 467 of the sensor head 465 can be configured to couple to a complementary coupling feature disposed within the housing 472. The coupling feature 467 (in this case, an electrical connector) can mechanically and electrically couple to the complementary coupling feature of the controller 407. The sensor device 466 can include one or more coupling features (e.g., mating threads) that couple to complementary coupling features (e.g., complementary mating threads) of the housing 472.

Figure 5:
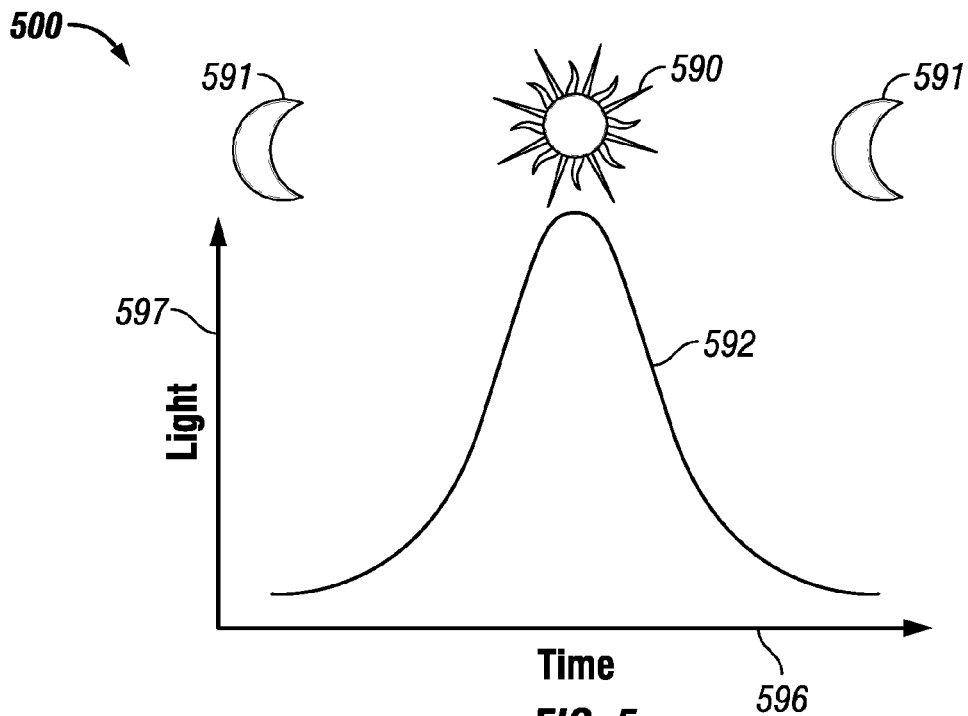
FIG. 5 shows a graph of natural daylight over time.

FIG. 5 shows a graph 500 of light 592 over time. The graph 500 has an amount of light along its vertical axis 597, and time along its horizontal axis 596. In this case, the only sources of light are the sun 590 during the day hours, and the sun's reflections off the moon 591 during nighttime hours. The plot of the light 592 on the graph 500 shows low light levels during the nighttime, and higher light levels during the daytime.

Figure 6:
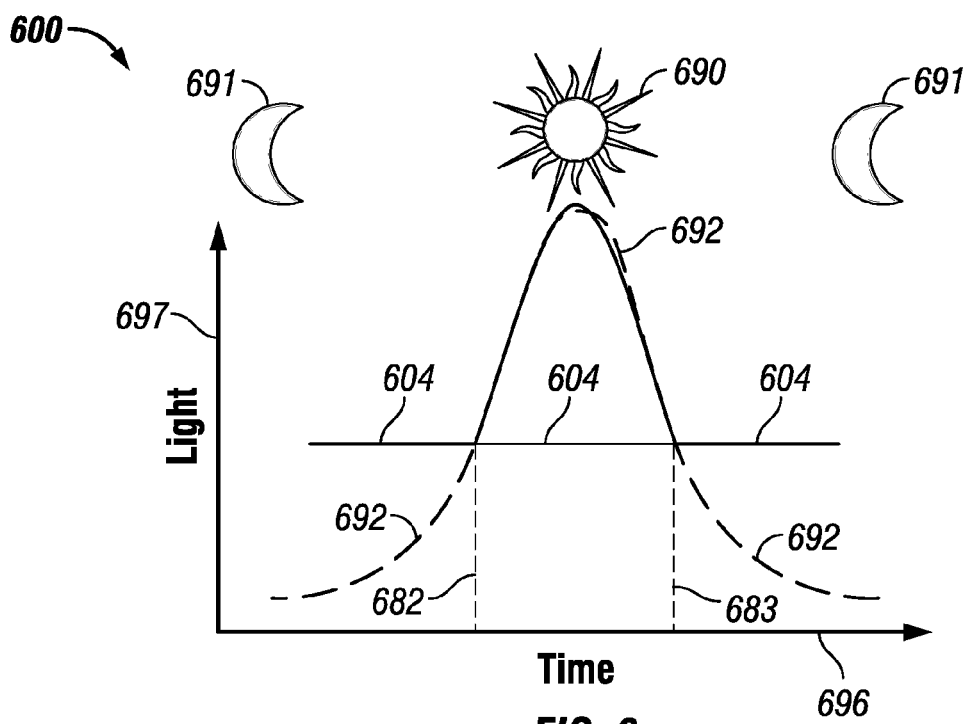
FIG. 6 shows a graph of light emitted by a light fixture superimposed with natural daylight over time.

FIG. 6 shows a graph 600 of light 604 emitted by a light fixture (e.g., light fixture 102) superimposed with natural daylight 692 emitted by the sun 690, as described above with respect to FIG. 5. If the light fixture has no dimming function, the light 604 emitted by the light fixture is substantially constant for any time that the light fixture is operating. If the light fixture has a dimming function (as with the dimming module 108 of FIG. 1), then the light 604 emitted by the light fixture can vary in one or more of a number of ways, depending on the configuration of the dimming function. Put another way, the light 604 indicates a behavioral purpose of a lighting system with the intention to give the user a specified total light level until the amount of natural daylight 692 is sufficient to remove the need for synthetic lighting sources (e.g., light 604).

Figure 7A:
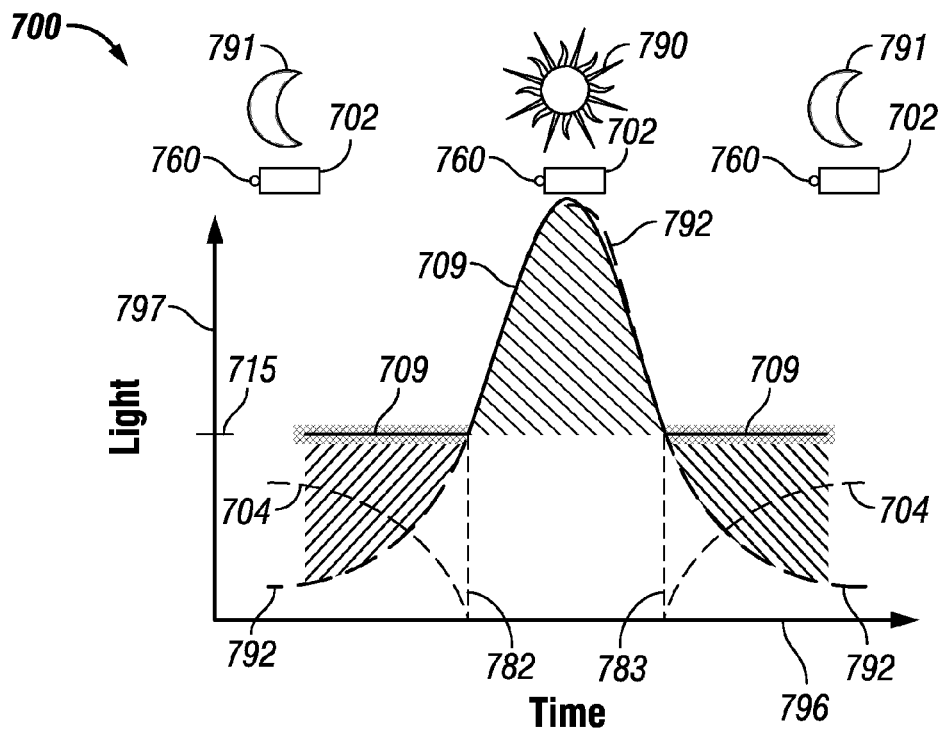
FIGS. 7A and 7B show other graphs of total light between a light fixture with a dimming function and natural daylight over time in accordance with certain example embodiments.
Figure 7B:
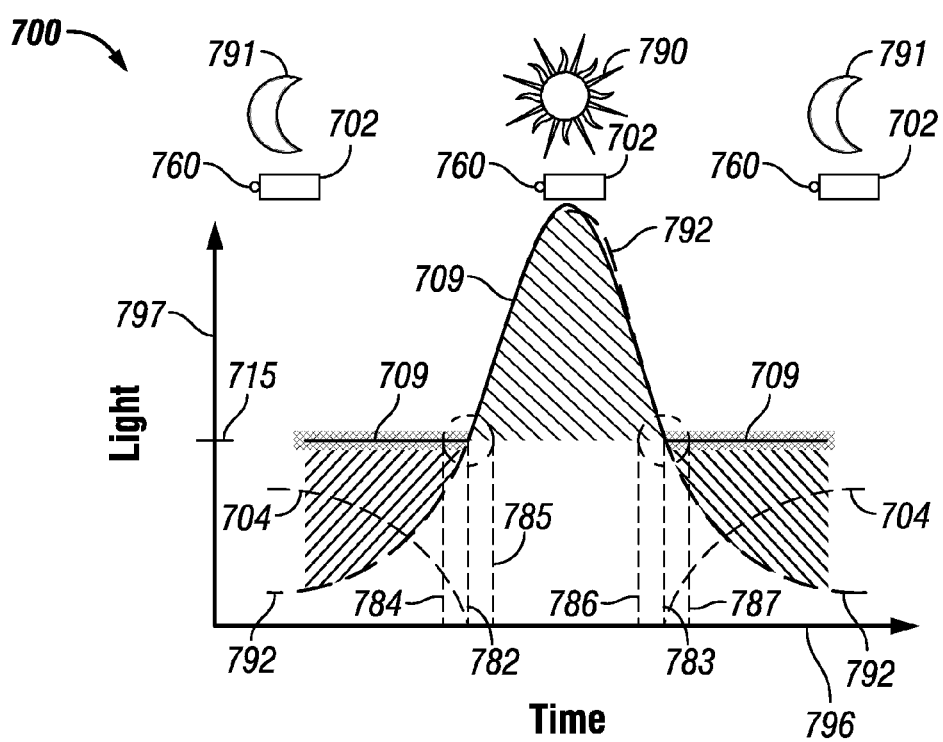

FIGS. 7A and 7B show graphs 700 of total light 709 between a light 704 emitted by a light fixture 702 with a dimming function and natural daylight 792 from the sun 790 over time in accordance with certain example embodiments. FIG. 7A shows a graph 700 where the example light fixture 702 is turned off and on precisely when the total light 709 exceeds or falls below, respectively, a threshold 715. FIG. 7B shows the graph 700 where the example light fixture 702 is turned off and on within a range when the total light 709 exceeds or falls below, respectively, the threshold 715. Referring to FIGS. 1-7B, the threshold 715 is some amount of light (e.g., a total light level target, a desired total light level, some other light level) that triggers when the controller (e.g., controller 107) of the sensor 760 turns off or on the light fixture 702. In some cases, the threshold 715 can represent the target total light amount 709 when the light fixture 702 is on. In such a case, the threshold 715 can represent the minimum total light amount 709. In other instances, the threshold 715 can represent an amount of light that allows for a hysteresis of operation.

As described above, the sensor 760 is directed to a volume of space where the light 704 is emitted from the light fixture 702. In FIG. 7A, starting at the far left (in the middle of the night, when a small natural light amount 792 (also sometimes called ambient light amount 792 herein) reflects off the moon 791), the light fixture 702 is on and emits enough light 704 so that the total light amount 709 detected by the sensor 760 is substantially equal to the threshold amount of light 715 (e.g., a desired total light level). As time moves closer to daylight and the natural light amount 792 detected by the sensor 760 increases, the dimmer of the light fixture 702 reduces the level of fixture light 704 emitted by the light fixture 702 so that the total light amount 709 remains substantially constant at the threshold value 715. In some cases, the threshold amount of light 715 does not represent a trigger of shutoff level, but instead merely represents a desired total light level or other soft value.

Once the natural light amount 792 detected by the sensor 760 exceeds the threshold value 715, as at time 782 on the graph 700 of FIG. 7A, the example controller of the light fixture 702 (or the associated sensor 760) turns off the light fixture 702 so that the level of fixture light 704 emitted by the light fixture 702 is zero. In this way, with the light fixture 702 turned off, the sensor 760 only detects the natural light amount 792 of the natural light. While the light fixture 702 is off (for example, between times 782 and 783 on the graph 700), the natural light amount 792 equals the total light amount 709, which is above the threshold value 715. As the day moves toward night, the natural light 792 amount decreases until, at time 783, the natural light amount 792 measured by the sensor 760 is less than the threshold value 715. In some cases, the threshold value 715 to trigger turning on and/or increasing the fixture light 704 of the light fixture 702 is different than the threshold value to trigger turning off and/or decreasing the fixture light 704 of the light fixture 702.

At this point, the controller turns the light fixture 702 back on and sets the dimmer level low (low level of fixture light 704) so that the total light amount 709 measured by the sensor 760 can be substantially the same as (such as in this example) or different than the threshold value 715. As evening turns to night, the natural light amount 792 measured by the sensor 760 continues to decrease, and so the controller increases the dimming level of the light fixture 702, thereby increasing the level of fixture light 704 emitted by the light source 702 and measured by the sensor 760 so that the total light amount 709 is substantially equal to the threshold value 715.

The graph 700 of FIG. 7B is substantially the same as the graph 700 of FIG. 7A, except that the controller can turn off the light fixture 702 within a range of times (in this case, time 784 through time 785). Similarly, the controller can turn on the light fixture 702 within a range of times (in this case, time 786 through time 787). Time 782 (when the controller turns the light fixture 702 off) falls within the range established by time 784 and time 785, and time 783 (when the controller turns the light fixture 702 on) falls within the range established by time 786 and time 787. Each of the range of times (e.g., time 784 through time 785, time 786 through time 787) around each can represent a hysteresis or deadband around each control point (e.g., time 782, time 783) to prevent constant cycling of the light fixture 702.

In certain example embodiments, the threshold value 715 can be any of a number of values. The threshold value 715 can be an absolute number (e.g., 1000 lumens), a percentage (e.g., 150% of the maximum level of the fixture light 704 (output) of the light fixture 702), or any other suitable value. The threshold value 715 can be set by any one or more of a number of factors or entities, including but not limited to a manufacturer's setting, a statute or regulation, a user, by default, a time of day, and a passage of time. For example, if the light fixture 702 is being used in California, thus requiring compliance with Title 24, the threshold value 715 can be set by the manufacturer as 150% of the maximum output of the light fixture 702. As stated above, in some cases, the threshold value to dim and/or turn off the light fixture 702 can be different than (e.g., more than, less than) the threshold value to increase illumination and/or turn on the light fixture 702.

Figure 8:
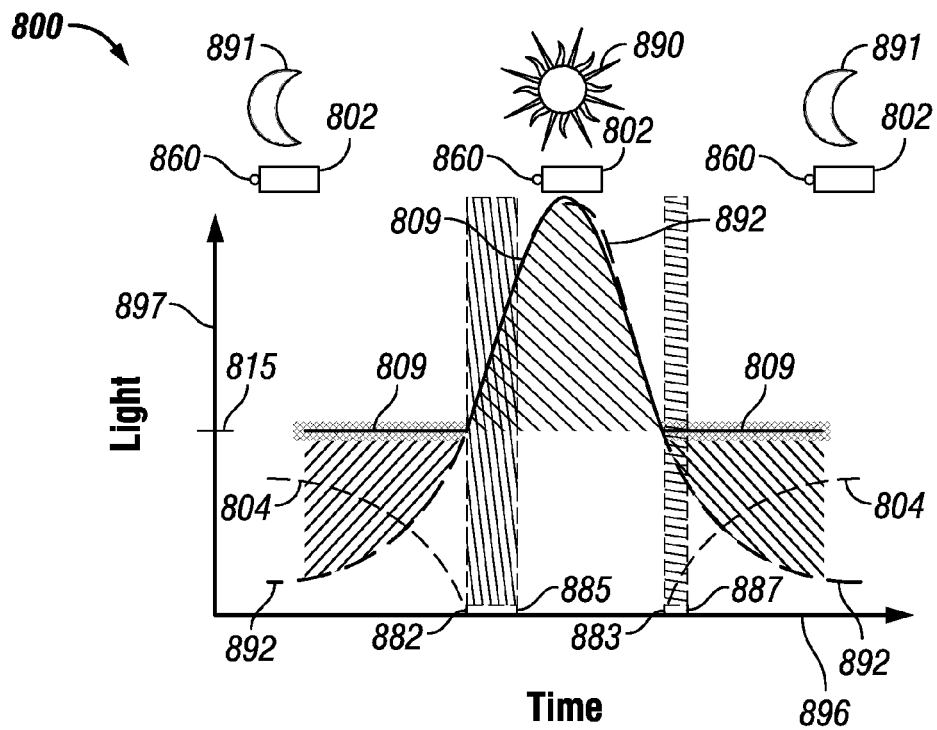
FIG. 8 shows another graph of total light between a light fixture with a dimming function and natural daylight over time in accordance with certain example embodiments.

FIG. 8 shows another graph 800 of total light 809 between a level of fixture light 804 emitted by a light fixture 802 with a dimming function and a natural light amount 892 over time in accordance with certain example embodiments. The graph 800 of FIG. 8 is substantially the same as the graph 700 of FIG. 7A, except as described below. Specifically, after the controller determines that the total light amount 809 exceeds threshold value 815 at time 882, the controller puts the light fixture 802 in standby mode (or some other reduced power level) for a period of time (in this case, until time 885) to be reasonably sure that the light source 802 does not need to produce additional fixture light 804. This function can be useful if the amount of natural light amount 892 measured by the sensor 860 spikes for a relatively brief period of time, temporarily causing the total light amount 809 to exceed the threshold value 815.

Similarly, when the controller determines that the total light amount 809 falls below the threshold value 815 when the light source 802 is off (in this case, at time 883), the controller puts the light fixture 802 in limited operation mode (or some other reduced power level) for a period of time (in this case, until time 887) to be reasonably sure that the light source 802 needs to produce additional fixture light 804 to keep the total light amount 809 at the threshold value 815. These reduced modes of operation of the light source 802 can occur before and/or after the light source 802 is to be turned on or off by the controller.

Figure 9A:
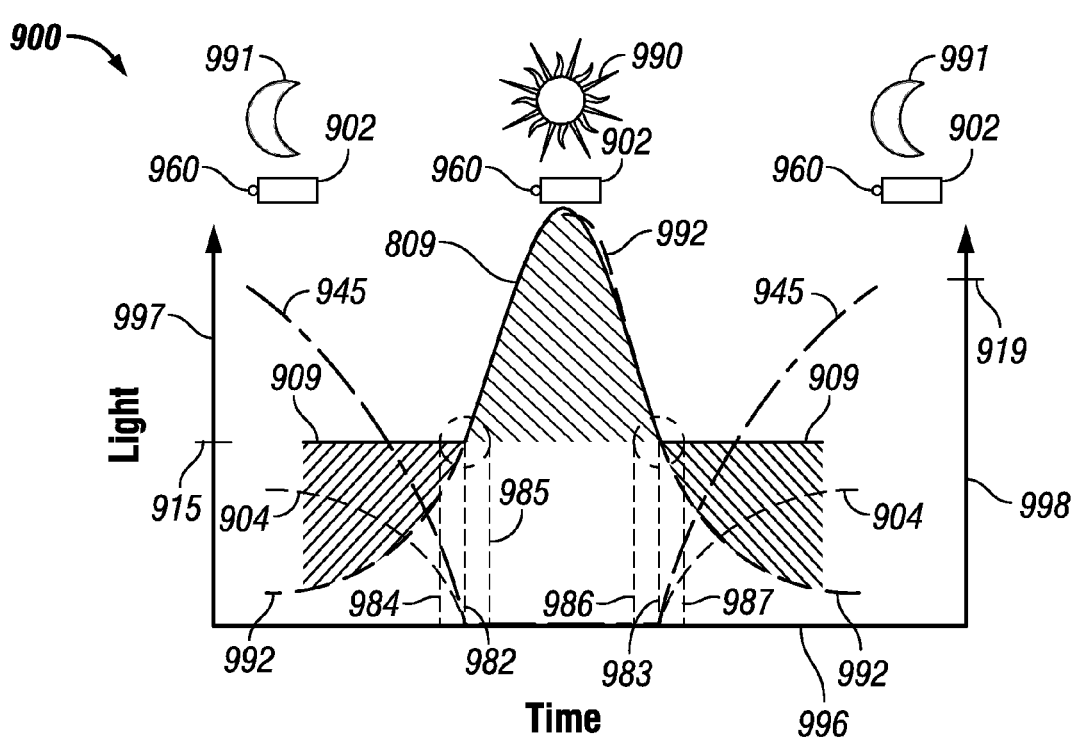
FIGS. 9A and 9B show still other graphs of total light between a light fixture with a dimming function and natural daylight over time in accordance with certain example embodiments.
Figure 9B:
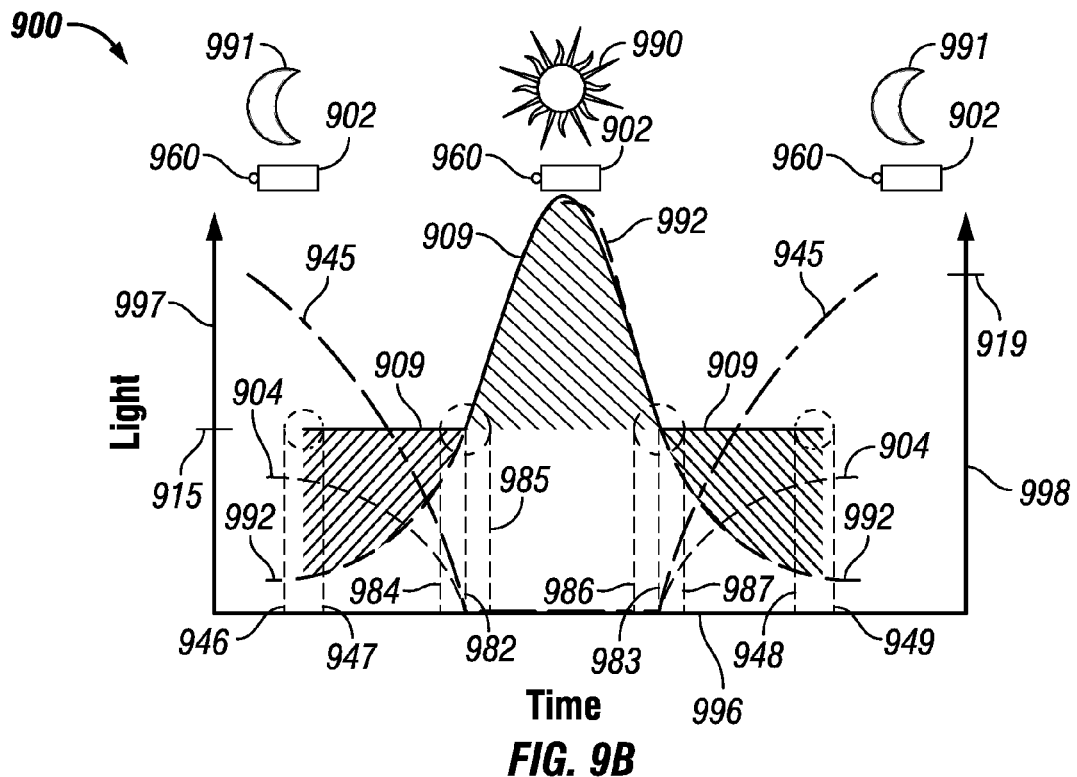

FIGS. 9A and 9B show still other graphs 900 of total light amount 909 between a level of fixture light 904 emitted a light fixture 902 with a dimming function and a natural light amount 992 over time in accordance with certain example embodiments. The graphs 900 of FIGS. 9A and 9B are substantially the same as the graphs of FIGS. 7A-8 above, except as described below. Specifically, the graph 900 of FIGS. 9A and 9B has a second vertical axis 998 that shows percentage of fixture light 904 output of the light fixture 902, where level 919 represents 100% of the fixture light output capability 945 for the light fixture 902. While the graph 900 of FIG. 9A shows the percentage of fixture light output capability 945 over time, the graph 900 of FIG. 9B additionally shows how the controller can perform a calibration to make any necessary adjustments to the threshold value 915.

Specifically, in certain example embodiments, the controller can have the sensor measure the level of fixture light 904 of the light fixture 902 when the fixture light output capability 945 is at level 919 (100%). This calibration can take place at any interval (one time only, daily, weekly, monthly, when a light source of the light fixture 902 is changed). This calibration can be useful in one or more of a number of circumstances, including but not limited to when a new light source is installed in the light fixture and when the natural light amount 992 changes (as with locations far north or south of the equator).

This ability to perform self-calibration can be important to accurately determine when the light fixture 902 should be turned on or off. In addition, this ability to perform self-calibration can be important to accurately determine when and to what extent a level of fixture light 904 of the light fixture 902 should be dimmed. As discussed above, a number of factors can affect the reading of the sensor 960, and so factory settings can prove to be insufficient for allowing the controller (e.g., controller 107) to operate (e.g., dim, turn on, turn off) the light fixture 902 within applicable standards or regulations.

For example, if the controller (e.g., controller 107) is programmed to turn off the light fixture 902 when the total light amount 909 is detected as being 150% of the maximum fixture light output capability (level 919) of the light fixture 902, then the controller can control the dimming and/or the on/off status of the light fixture 902 based on the maximum fixture light output capability (level 919), as measured by the sensor 960, of the light fixture 902. In this case, if example embodiments of self-calibration of the controller based on actual readings of the sensor 960 when the light fixture is operating at 100% are not used, then the controller may turn on/off the light fixture at times when the total light measured by the sensor 960 is sufficiently more than or sufficiently less than 150% of the maximum fixture light output capability (level 919) of the light fixture 902.

Also, by not using example embodiments of self-calibration of the controller based on actual readings of the sensor 960 when the light fixture is operating at 100%, the threshold value 915 (also, in some cases, the target overall light level) can be incorrect. As the natural light amount 992 decreases, the controller slowly increases its dim level output, thus increasing the level of fixture light 904 (represented by the fixture light output capability 945) of the light fixture 902 to maintain the target light level 915. Once that dim level output reaches its maximum value (100%, which corresponds to level 919), the total light amount 909 measured by the sensor 960 is substantially completely contributed by the level of fixture light 904 of the light fixture 902, and so the controller interprets this sensor reading as the 100% output value (level 919) from the light fixture 902.

This allows the controller to calculate what total light level represents some percentage (e.g., 150%) of the maximum light output capability (level 919 of curve 945) of the light fixture 902. In this way, when the natural light amount 992 increases, the controller slowly dims (lowers) the level of fixture light 904 output by the light fixture 902 to its minimum light output capability (curve 945 between time 982 and time 983). Between times 984 and 982, when the dimming level of the light fixture 902 is at a minimum, the natural light amount 992 can continue to increase. The sensor 960 continues to monitor the total light amount 909, and if it crosses the threshold (e.g., 150% of the maximum light output capability (level 919) of the light fixture 902), the controller turns the light fixture 902 completely off (at around time 982). Then once the time of day passes the peak ambient light level, the contribution of the natural light amount 992 to the total light amount 909 will begin to decrease. Once the total light amount 909 decreases below the threshold value (e.g., 150%), between times 986 and 983, the controller will reactivate the light fixture 902 at its minimum output dimming level and slowly increase the level of fixture light 904 as the natural light amount 992 further decreases. As stated above, in some cases, the threshold value to turn off the light fixture 902 can be different than the threshold value to turn on the light fixture 902.

Figure 10:
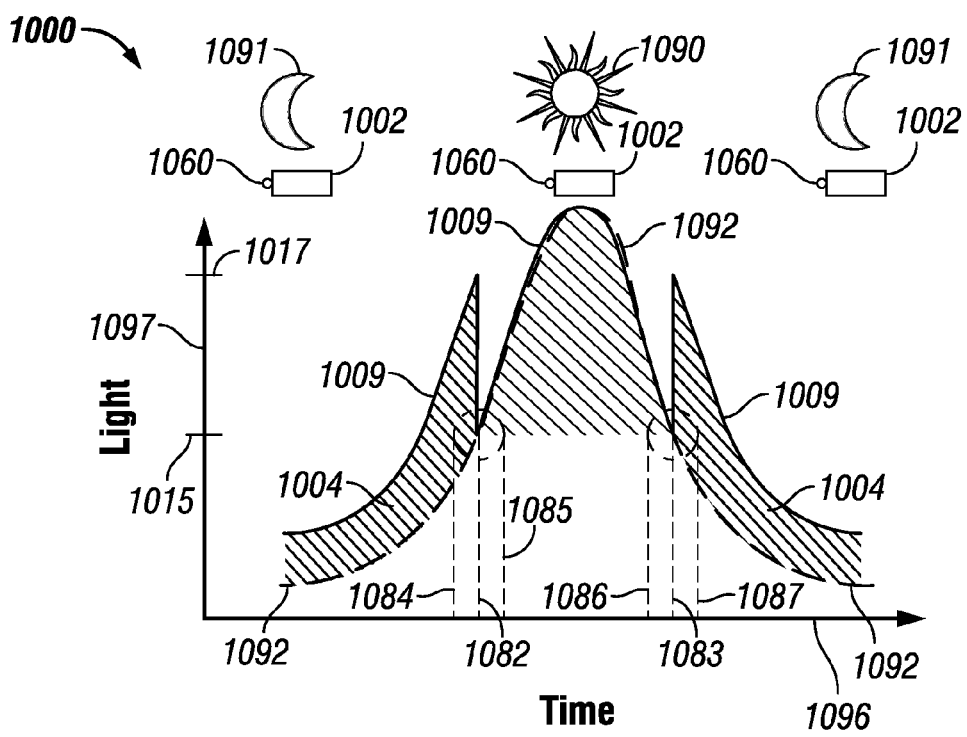
FIG. 10 shows a graph of total light between a light fixture without a dimming function and natural daylight over time in accordance with certain example embodiments.

FIG. 10 shows a graph 1000 of total light amount 1009 between a level of fixture light 1004 emitted a light fixture 1002 without a dimming function and a natural light amount 1092 over time in accordance with certain example embodiments. The graph 1000 of FIG. 10 is substantially the same as the graphs of FIGS. 7A-9B above, except as described below. Specifically, since the light fixture 1002 does not have a daylight dimming function, the amount of fixture light 1004 emitted by the light source 1002 is substantially constant when the light source 1002 is on. In such a case, an extra threshold value 1017 (e.g., a shut-off threshold value, a turn-on threshold value) can be used. Threshold value 1017 is used to determine when the controller should turn off the light fixture 1002, and so has a higher value compared to threshold value 1015, which is used to determine when the controller should the light fixture 1002 back on. In some cases a dimming function can be based on one or more factors. For example, a dimming function can be based on daylight dimming. As another example, a dimming function can be based on a scene level. A light fixture described herein can have a dimming function based on one or more of a number of factors.

The threshold value 1017 should be approximately equal to the threshold value 1015 plus the output of the light fixture 1002. By having the threshold value 1017, rather than the threshold value 1015, dictate when the light fixture 1002 should be turned off, the controller will avoid a period of time (for example, between time 1082 and time 1085) where the light fixture is constantly turned off and on until the amount of natural light 1092 is sufficient to exceed the threshold value 1015 without fixture light 1004 from the light fixture 1002.

Figure 11:
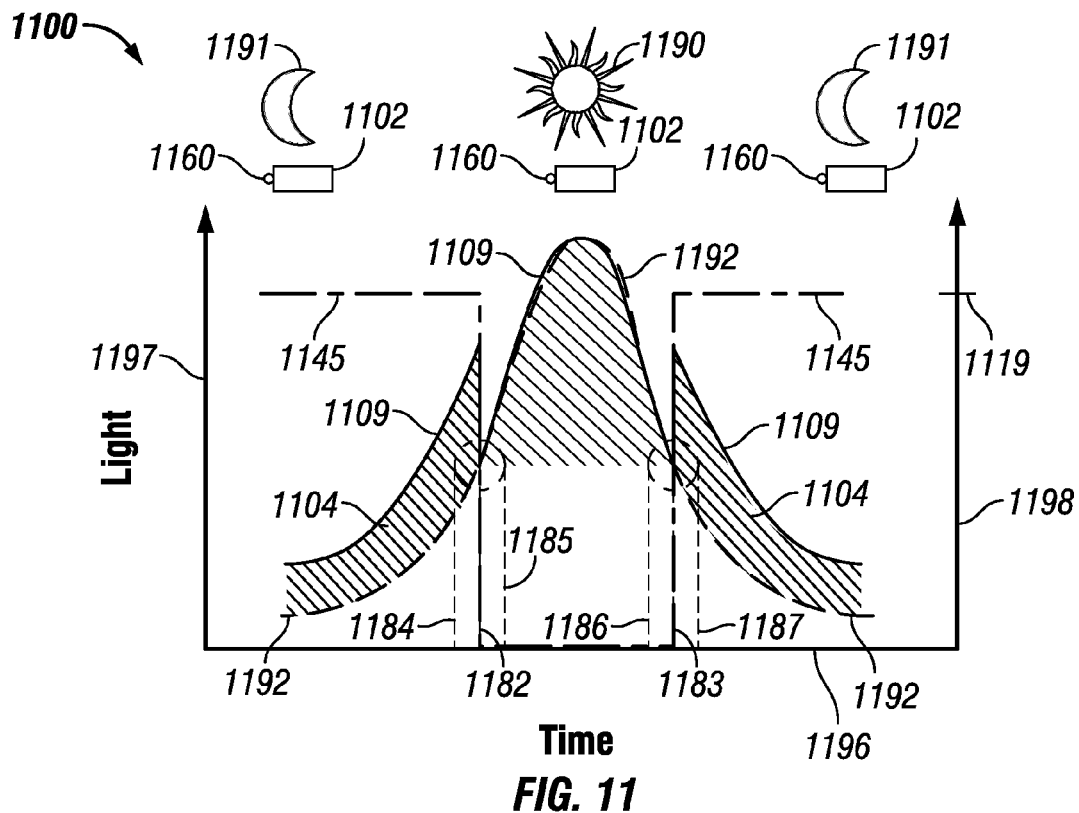
FIG. 11 shows another graph of total light between a light fixture without a dimming function and natural daylight over time in accordance with certain example embodiments.

FIG. 11 shows another graph 1100 of total light amount 1109 between a level of fixture light 1104 emitted by a light fixture 1102 without a dimming function and a natural light amount 1192 over time in accordance with certain example embodiments. The graph 1100 of FIG. 11 is substantially like the graph 1000 of FIG. 10, except that the graph 1100 of FIG. 11 has an additional vertical axis 1198 showing the percentage of fixture light output capability 1145 of the light fixture 1102, where level 1119 represents 100% of the fixture light output capability 1145. In this case, the fixture light output capability 1145 is a step function, to show that, without dimming capability, the level of fixture light 1104 emitted by the light fixture 1102 is either full on or full off.

Figure 12:
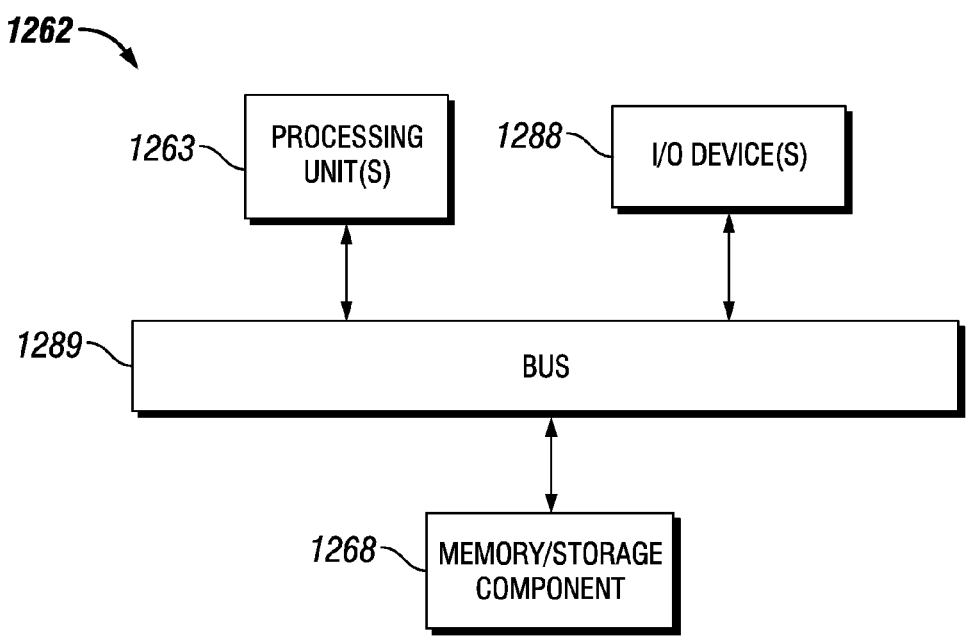
FIG. 12 shows a computing device in accordance with certain example embodiments.

FIG. 12 illustrates one embodiment of a computing device 1262 that implements one or more of the various techniques described herein, and which is representative, in whole or in part, of the elements described herein pursuant to certain exemplary embodiments. Computing device 1262 is one example of a computing device and is not intended to suggest any limitation as to scope of use or functionality of the computing device and/or its possible architectures. Neither should computing device 1262 be interpreted as having any dependency or requirement relating to any one or combination of components illustrated in the example computing device 1262.

Computing device 1262 includes one or more processors or processing units 1263, one or more memory/storage components 1268, one or more input/output (I/O) devices 1288, and a bus 1289 that allows the various components and devices to communicate with one another. Bus 1289 represents one or more of any of several types of bus structures, including a memory bus or memory controller, a peripheral bus, an accelerated graphics port, and a processor or local bus using any of a variety of bus architectures. Bus 1289 includes wired and/or wireless buses.

Memory/storage component 1268 represents one or more computer storage media. Memory/storage component 1268 includes volatile media (such as random access memory (RAM)) and/or nonvolatile media (such as read only memory (ROM), flash memory, optical disks, magnetic disks, and so forth). Memory/storage component 1268 includes fixed media (e.g., RAM, ROM, a fixed hard drive, etc.) as well as removable media (e.g., a Flash memory drive, a removable hard drive, an optical disk, and so forth).

One or more I/O devices 1288 allow a customer, utility, or other user to enter commands and information to computing device 1262, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 1262 is connected to a network (not shown) (e.g., a local area network (LAN), a wide area network (WAN) such as the Internet, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 1262 includes at least the minimal processing, input, and/or output means necessary to practice one or more embodiments.

Further, those skilled in the art will appreciate that one or more elements of the aforementioned computer device 1262 is located at a remote location and connected to the other elements over a network in certain exemplary embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Example embodiments provide for self-learning auto-cutoff daylight detection control for light fixtures. Specifically, certain example embodiments allow for a controller of a light fixture to communicate with and control one or more sensors and/or one or more other components of the light fixture. In some cases, example light fixtures can be located in particular environments (e.g., a parking garage). In such a case, the light fixture can comply with one or more applicable standards for that environment. Communication between the example light fixture and other components (e.g., a user, a sensor, a master controller) of the system can be conducted using wired and/or wireless technology.

By controlling the light fixture, example embodiments can be used to put sensors and/or one or more components of the light fixture in sleep mode when they are not in use. Thus, example embodiments can result in lower power usage. Example embodiments can help ensure that the light fixture and/or the sensors comply with applicable standards, regulations, laws, and/or other compliance issues. Example embodiments can be designed for use for any period of time (e.g., a day, a week, a month, a year, multiple years, the life of a light fixture). Further, example embodiments can be used continuously for such period of time to utilize its self-learning (also called self-calibration) functionality.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A light fixture, comprising:
   at least one light fixture component comprising at least one light source that emits a first level of fixture light;
   at least one sensor that measures a first total light amount at a first time of a first day, wherein the first total light amount comprises the first level of fixture light and a first natural light amount; and
   a controller coupled to the at least one sensor and the at least one light fixture component, wherein the controller controls and communicates with at least one sensor,
   wherein the controller further controls the at least one light fixture component based on the first total light amount measured by the at least one sensor at the first time of the first day,
   wherein the controller calibrates a first threshold value for controlling the at least one light fixture component, wherein the first threshold value is based on a sensor reading taken by the at least one sensor when the first total light amount measured by the at least one sensor is substantially equal to the first level of fixture light.

2. The light fixture of claim 1, wherein the controller terminates power to the at least one light fixture component when the first total light amount exceeds the first threshold value, wherein terminating the power to the at least one light fixture component eliminates the first level of fixture light.

3. The light fixture of claim 1, wherein the first threshold value is further calibrated by the controller based on a minimum dimming level of the at least one light source.

4. The light fixture of claim 2, wherein the controller provides the power to the at least one light fixture component when the first total light amount falls below a second threshold value, wherein the power provided to the at least one light fixture component causes the at least one light source to emit the first level of fixture light.

5. The light fixture of claim 4, wherein the second threshold value is calibrated by the controller based on a sensor reading taken by the at least one sensor when the first total light amount measured by the at least one sensor is greater than the first natural light amount.

6. The light fixture of claim 2, wherein the controller provides the power to the at least one light fixture component when the first total light amount falls below the first threshold value.

7. The light fixture of claim 1, wherein the at least one sensor is disposed external to a housing of the light fixture.

8. The light fixture of claim 1, wherein the controller comprises:
   a hardware processor;
   memory comprising a plurality of instructions; and
   a control engine that executes the plurality of instructions on the hardware processor to control and communicate with the at least one sensor and the at least one light fixture component.

9. A controller for a light fixture, the controller comprising:
   memory comprising a plurality of instructions; and
   a control engine coupled to the memory, wherein the controller is configured to send and receive communication signals with at least one sensor and at least one light fixture component based on the plurality of instructions, wherein the at least one light fixture component comprises at least one light source, wherein the at least one sensor measures a first total light amount at a first time of a first day, wherein the first total light amount comprises the first level of fixture light and a first natural light amount, wherein the control engine compares the first total light amount to a threshold value, wherein the control engine further controls the at least one light fixture component based comparing the first total light amount to the threshold value, wherein the at least one light source emits a first level of fixture light based on the control engine controlling the at least one light fixture component, wherein the first natural light amount occurs at a second time of a second day, wherein the control engine self-calibrates for the first total light amount comprising the first natural light amount at the second time of the second day based on the first time of the first day.

10. The controller of claim 9, wherein the at least one light fixture component further comprises a power module and a dimmer that are coupled to the control engine and the at least one light source.

11. The controller of claim 9, wherein the at least one light source is replaced by at least one replacement light source, wherein the control engine self-calibrates based upon differences in characteristics between the at least one light source and the at least one replacement light source.

12. A light fixture, comprising:
at least one light fixture component comprising at least one light source that emits a first level of fixture light;
at least one sensor that measures a first total light amount at a first time of a first day, wherein the first total light amount comprises the first level of fixture light and a first natural light amount; and
a controller coupled to the at least one sensor and the at least one light fixture component, wherein the controller controls and communicates with at least one sensor,
wherein the controller further controls the at least one light fixture component based on the first total light amount measured by the at least one sensor at the first time of the first day, wherein the at least one light fixture component further comprises a dimming module coupled to the controller and the light source, wherein the dimming module adjusts the first level of fixture light to a second level of fixture light emitted by the at least one light source, wherein the controller adjusts, using the dimming module, the at least one light source to emit the second level of fixture light based on a second natural light amount at a second time of the first day, wherein the first total light amount at the second time of the first day comprises the second level of fixture light and the second natural light amount.

13. The light fixture of claim 12, wherein the at least one sensor measures a second total light amount comprising the second level of fixture light and the second natural light amount during the first day.

14. The light fixture of claim 12, wherein a difference between the first level of fixture light and the second level of fixture light is substantially equal to the difference between the first natural light amount and the second natural light amount.

15. The light fixture of claim 12, wherein the dimming module adjusts the first level of fixture light to a second level of fixture light emitted by the at least one light source, wherein the second level of fixture light is substantially equal to a full output of the at least one light source.

16. The light fixture of claim 15, wherein the first total light amount at a third time of the first day comprises the second level of fixture light and a second natural light amount, wherein the second natural light amount is substantially zero at the third time of the first day.

17. The light fixture of claim 12, wherein the controller keeps the first total light amount substantially constant by adjusting a level of fixture light emitted by the at least one light source as long as the first total light amount is less than a first threshold value.

* * * * *

UNITED STATES PATENT AND TRADEMARK OFFICE
CERTIFICATE OF CORRECTION

| | | |
|---|---|---|
| PATENT NO. | : 9,686,838 B2 | Page 1 of 1 |
| APPLICATION NO. | : 15/142571 | |
| DATED | : June 20, 2017 | |
| INVENTOR(S) | : Brian Eugene Elwell, Timothy R. Kemp and Jonathan Andrew Whitten | |

It is certified that error appears in the above-identified patent and that said Letters Patent is hereby corrected as shown below:

In the Claims

Column 21, Line 9, after the word "based" please add the word "on"

Signed and Sealed this
Tenth Day of October, 2017

Joseph Matal
*Performing the Functions and Duties of the*
*Under Secretary of Commerce for Intellectual Property and*
*Director of the United States Patent and Trademark Office*